United States Patent [19]
Powell

[11] 4,119,365
[45] Oct. 10, 1978

[54] TROUGH REFLECTOR

[76] Inventor: Roger Andrew Powell, 1455 Whitwood Dr., Norristown, Pa. 19401

[21] Appl. No.: 682,109

[22] Filed: Apr. 30, 1976

[51] Int. Cl.² ............................................. G02B 5/10
[52] U.S. Cl. .................................. 350/293; 126/270; 126/271; 350/295; 350/320
[58] Field of Search ............... 350/292, 293, 295, 299, 350/320; 126/270, 271

[56] References Cited
U.S. PATENT DOCUMENTS

| 1,946,184 | 2/1934 | Abbot | 126/271 |
|---|---|---|---|
| 1,951,404 | 3/1934 | Goddard | 350/292 X |
| 4,022,523 | 5/1977 | Lindonnen et al. | 350/295 |

Primary Examiner—F. L. Evans
Attorney, Agent, or Firm—Warren W. Kurz

[57] ABSTRACT

A method for making a large trough reflector of cylindrical shape comprises the step of exerting twisting moments on the opposing longitudinal edges of a flexible reflective sheet. The twisting moments are exerted in equal but opposite increments until the shape of the reflector is governed mainly by the twisting moments, rather than any end loading forces which, acting in the plane of the longitudinal edges of the sheet, would tend to push together or separate the edges of the sheet. Also disclosed is a trough reflector manufactured according to such method.

20 Claims, 10 Drawing Figures

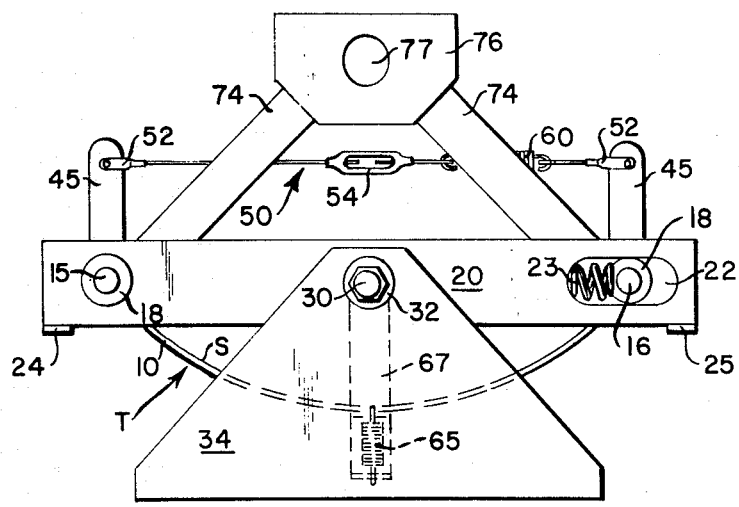
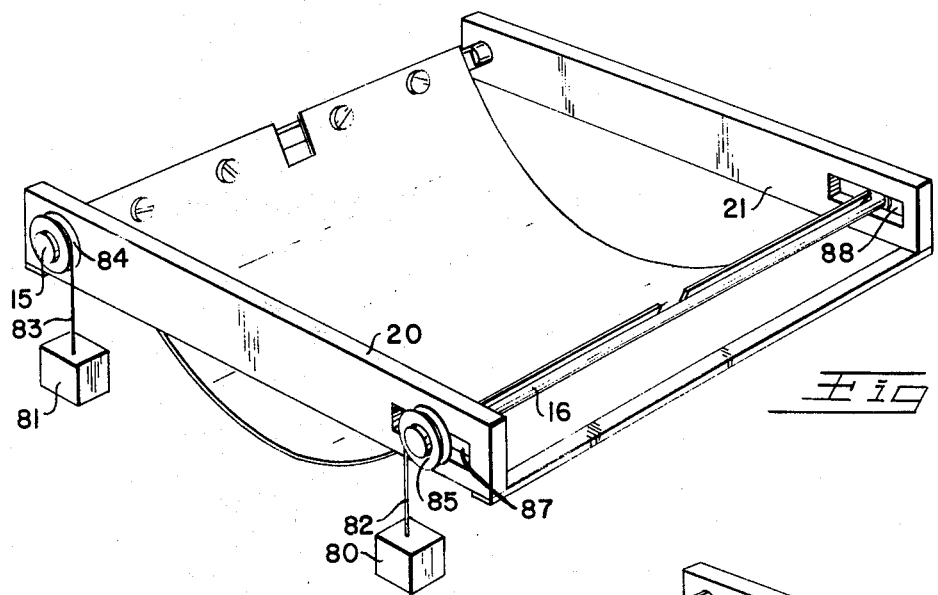
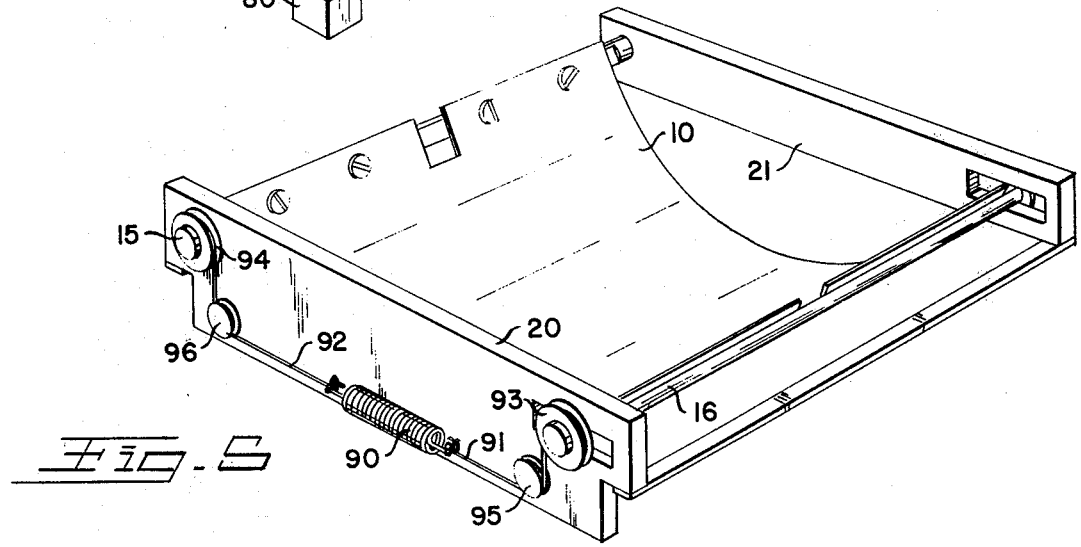

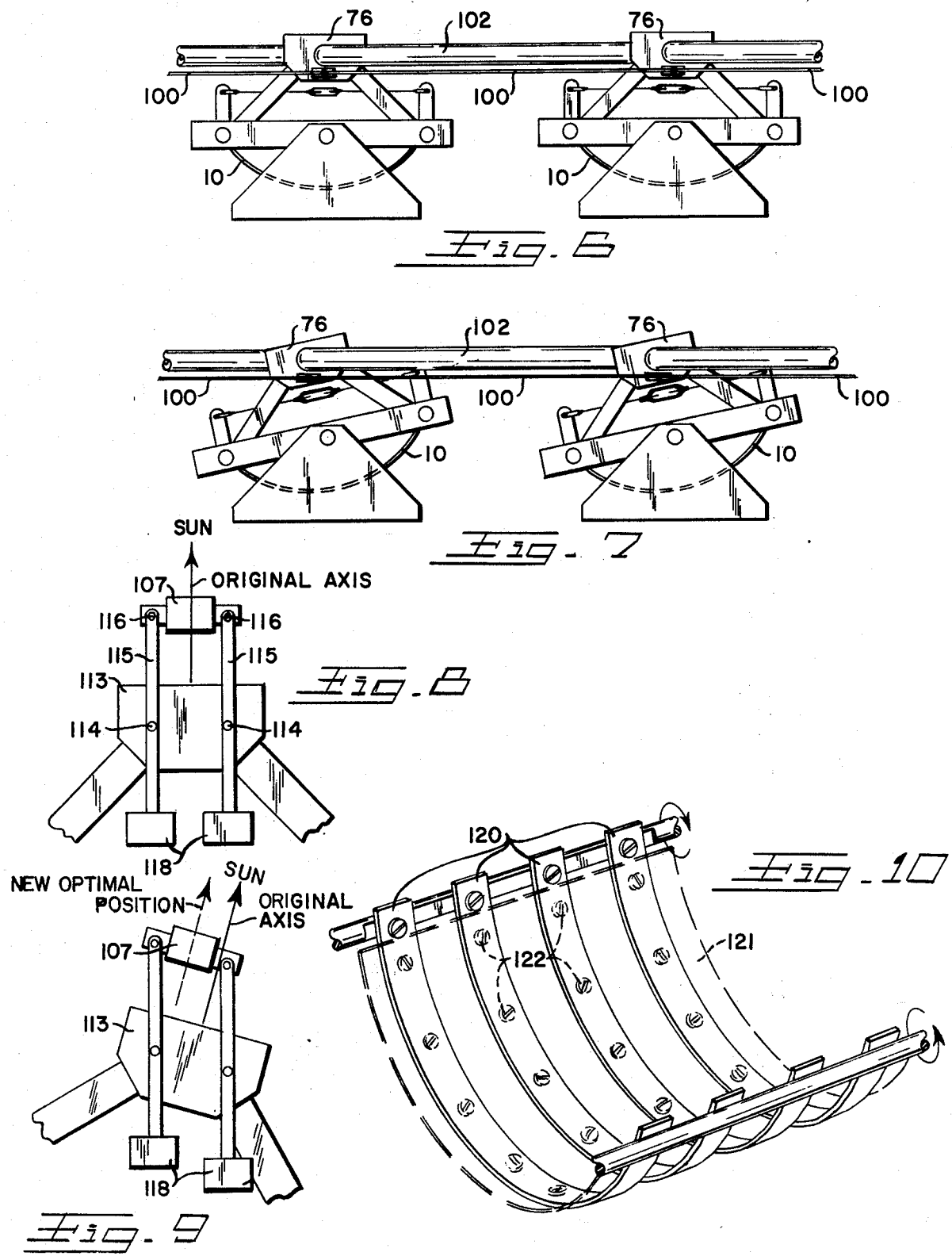

4,119,365

TROUGH REFLECTOR

BACKGROUND OF THE INVENTION

The present invention relates to solar energy conversion apparatus and, more particularly, to improvements in solar energy collectors of the trough reflector variety.

Considerable time and effort is presently being expended in determining the feasibility of utilizing the sun's energy as a means for providing the heating and power needs of home and industry. While there is little question that know-how exists for converting solar energy into vast quantities of heat and electrical energy, the principle stumbling block confronting widespread commercial use of the sun's rays for such purposes is one of economics. Because of the high costs associated with the manufacture of efficient solar energy converters of a practical size, the economics still favor the use of conventional fossil fuels.

A major factor contributing to the relatively high cost of solar energy converters is the cost associated with the manufacture of the collector component; i.e., the reflector or lens which acts to collect and focus solar rays to form a region of intense heat. To produce significant quantities of heat or electrical energy from solar energy, collectors of substantial size are required. To satisfy this requirement, large trough-shaped reflectors have been proposed and, in some instances, are being utilized as the collector element. While such reflectors are substantially less expensive than refractive elements of comparable light-gathering power, their manufacturing costs are, for the size required, still at a level which renders large-scale energy production economically non-feasible. To date, trough reflectors have been conceived and/or made of glass, space-frame structures and segmented sheets, or molded composite plastic materials. See, for instance, the trough reflector disclosed in U.S. Pat. No. 3,841,738 to Caplan. Such conventional reflectors are not only difficult to fabricate, but also they require the use of relatively expensive materials. As a consequence, none is economically attractive.

Thus, one of the problems which must be solved before today's solar energy converters can become commercially attractive is one of producing a low-cost solar energy collector of suitable size and focusing qualities.

SUMMARY OF THE INVENTION

An object, therefore, of the present invention is to provide a solar energy collector which lends itself to low-cost manufacture.

Another object of the invention is to provide an improved method of making trough-shaped reflectors which are of a size and quality suitable for large-scale solar energy conversion work.

According to this invention, it has been found that trough reflectors of a size and quality suitable for solar energy conversion work, can be inexpensively fabricated from large sheets of plastic or sheet-metal by merely subjecting the longitudinal edges of such sheets to appropriate twisting moments. According to a preferred embodiment, a trough reflector of substantially cylindrical cross-section is produced from a flexible planar member by grasping the opposing longitudinal edges of the flexible planar member and exerting equal but opposite twisting moments about axes substantially coincident with such edges. As the twisting moments are exerted, the longitudinal edges of the flexible planar member are allowed to move freely toward each other. The twisting moments are increased until the "end loading" forces in the planar member (i.e., forces which would act to push the longitudinal edges apart or together) are substantially zero. At this point, the shape of the planar member is only governed by so-called "pure-bending" and, theoretically, this shape is perfectly cylindrical.

In addition to a flexible planar member, a trough reflector constructed in accordance with a preferred embodiment of the invention includes a pair of spaced parallel elongated members for engaging the planar member at its opposing longitudinal edges, and means for simultaneously rotating the elongated members in equal increments but in opposite directions about their respective longitudinal axes, to exert the requisite twisting moments in the flexible planar member. Optionally, means are provided for modifying the cylindrical shape so as to better approximate the shape of a paraboloid, the ideal shape for a reflective solar energy collector. Such a modification is achieved by exerting an appropriate force at the midpoint of deflection of the trough reflector.

Other objects and the various advantages of the invention will become apparent to those skilled in the art from the ensuing description of preferred embodiments, reference being made to the accompanying drawings in which like reference characters designate like parts.

BRIEF DESCRIPTION OF THE DRAWINGS

FIGS. 1-3 are perspective, side elevational and end views, respectively, of a trough reflector structured in accordance with a preferred embodiment of the invention;

FIGS. 4 and 5 are end views of the FIG. 1 trough reflector illustrating alternate devices for producing twisting moments in the reflective element of the trough reflector;

FIGS. 6 and 7 are end views of several trough reflectors coupled together and directed at zero and non-zero sun angles respectively;

FIGS. 8 and 9 are end views of apparatus for adjusting the position of the transducer element of the solar energy conversion apparatus to compensate for the effects of gravity on the shape of the trough reflector at different tracking angles; and FIG. 10 is a perspective view of an alternate design of a trough reflector structure including a framework wherein the reflector is shown in phantom lines.

DETAILED DESCRIPTION OF PREFERRED EMBODIMENTS

Figure 1:
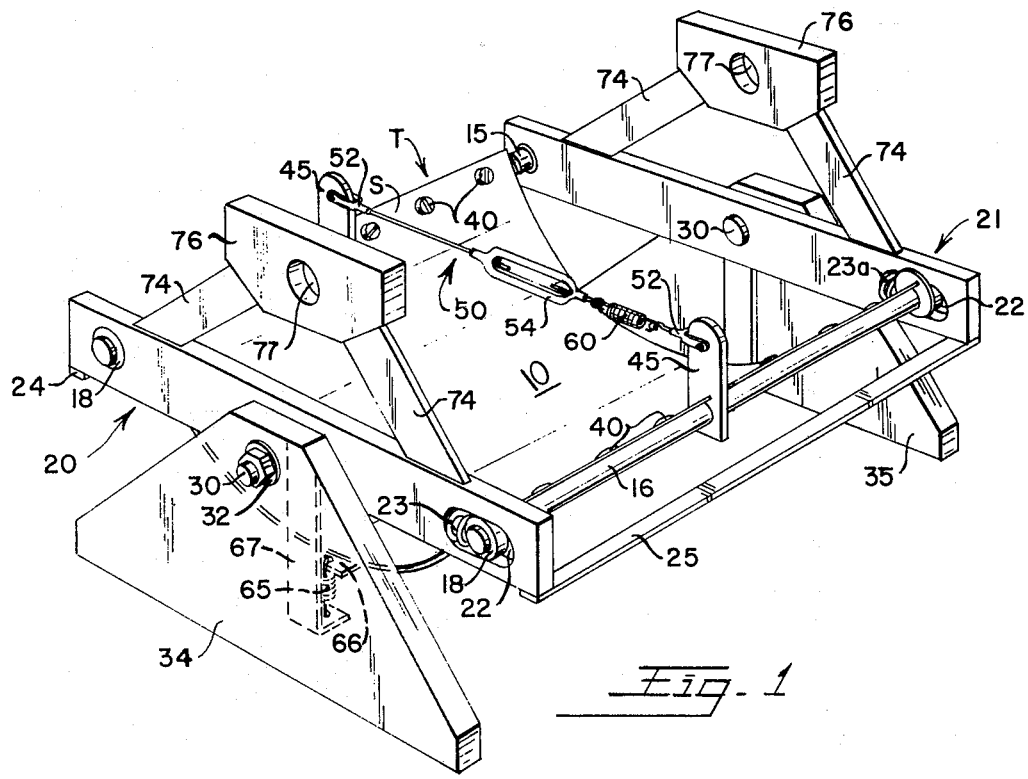
Figure 2:
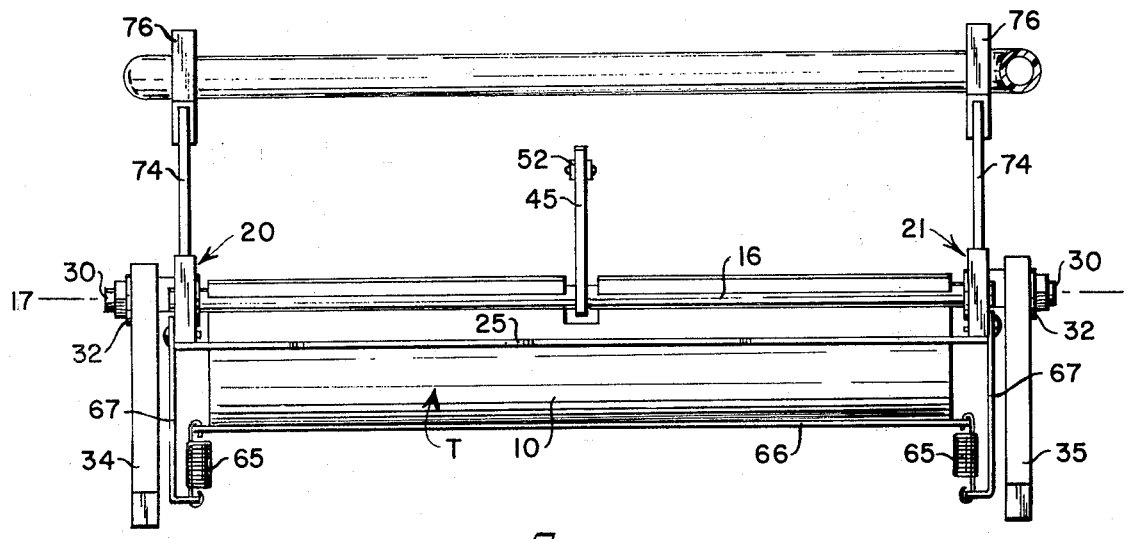

Referring now to the drawings, particularly FIGS. 1-3, a solar energy conversion apparatus incorporating a preferred embodiment of the invention includes a trough reflector T comprising a flexible planar member 10, preferably made from sheet-metal or plastic. Planar member 10 is supported in a flexed concave condition by a pair of torquing shafts 15, 16. The upper surface S of the planar member is made reflective, either by highly polishing the surface, or by coating it with a reflective material, such as aluminum. Torquing shafts 15, 16 share a common plane 17 and extend parallel to each other. Each shaft is rotatably supported, via bearings 18, between a pair of transverse beams 20, 21 which extend parallel to each other. Preferably, the bearings which rotatably support torquing shaft 16 are slidably mounted in slots 22 formed in transverse beams 20, 21. By this arrangement, the spacing between the torquing shafts is variable. A pair of compression springs 23, 23a, discussed in more detail below, are positioned within slots 22 and act to bias torquing shaft 16 away from shaft 15. The spacing between the transverse beams is maintained constant by a pair of spaced longitudinal beams 24, 25, the ends of which are joined to the transverse beams in the positions shown in FIGS. 1 and 2.

Outwardly extending from each of the transverse beams 20, 21 is a pin 30 which is rotatably supported via bearing 32, carried by the legs 34, 35 of ground support. In this manner, the trough reflector can be pivoted to enable it to be directed toward and follow, by a suitable sidereal drive mechanism, the movement of the sun.

As best shown in FIG. 1, the opposing longitudinal edges of planar member 10 are rigidly connected to the torquing shafts 15, 16 by screws 40. Rigidly connected to and extending upwardly from approximately the midpoint of each of the two torquing shafts is a pair of torque arms 45. The free ends of the torque arms 45 are connected by a tie rod 50, the ends of which are joined to the torque arms 45 by clevis joints 52. The length of tie rod 50 is adjustable by means of a turnbuckle 54. As turnbuckle 54 is tightened, the free ends of torque arms 45 are pulled toward each other, thereby simultaneously varying the angular positions of the torquing shafts in equal but opposite increments. Also, as the turnbuckle is tightened, lateral forces are exerted on the torquing shafts which urge the shafts toward each other in plane 17.

As the angular positions of the torquing shafts are varied, different forces are exerted on planar member 10, causing it to assume various concave shapes. At any given time the shape of the planar member is determined by the combination of (1) the twisting moments exerted on the longitudinal edges by the rotation of shafts 15, 16, and (2) the end loading forces (i.e., (a) forces acting in plane 17 tending to press together the longitudinal edges of planar member 10, and (b) tension and compression forces acting through the transverse beams 20, 21). However, in varying the angular positions of the respective torquing shafts, one finds that there is one angular position, for a given spacing between the torque shafts and a given width of the planar member, at which the net forces exerted on the planar member is such that it assumes a substantially cylindrical shape. At this angular position, the net end loading forces on the planar member are substantially zero, and the curvature of the reflector is governed solely by the twisting moments exerted on the longitudinal edges of the reflector.

Actually, planar member 10, when subjected to the twisting moments above, behaves much like a structural beam. Thus, the relationship between its midpoint deflection $y$ and the bending or twisting moment $M_b$ is predictable from the general equation: $M_b = 8EIy/w^2$, where $M_b$ is the bending moment required to give rise to vertical deflection $y$ of the planar member, $E$ is Young's Modulus, $I$ is the bending moment of inertia of the planar member and $w$ is the width of the deflector.

In order to detect when, during rotation of the torquing shafts, there is substantially zero end loading of the planar member and, hence, when the shape of the reflector is substantially cylindrical, spring members 23, 23a and 60 can be added to the apparatus. As mentioned above, spring members 23, 23a are compression springs and they are fitted in slots 22 formed in the transverse beams 20, 21. Springs 23, 23a are selected to have identical spring constants and they act collectively to bias torquing shaft 16 away from torquing shaft 15. Spring member 60 is a tension spring, and it is positioned in the tie rod 50 as shown. By observing the deflection of the spring member and having knowledge of their respective spring constants, one may monitor the forces acting through the turnbuckle and the forces being reacted through the transverse beams. In order to have no end loading on the reflector, the turnbuckle force must be equally and oppositely reacted by the transverse beams. The turnbuckle force may be monitored by the extension of tension spring 60, and the reaction forces in the transverse beams may be monitored by the combined compressions of compression springs 23, 23a.

At the optimal line of focus L of the trough T there is positioned a radiation responsive receiver R which acts to convert the solar radiation concentrated hereon by the trough reflector to a useful form of energy. One type of receiver is the "working fluid" type which comprises a solar radiation absorbing liquid (e.g., a fluorocarbon refrigerant, water, or amonia) flowing through a conduit. Such a conduit can be held at the optimal focus by two pairs of struts 74, and end plates 76 which are provided with a circular aperture 77 for receiving the conduit. The working fluid acts to convert the solar energy to thermodynamic energy which, in turn, can subsequently be converted to electrical energy. Alternatively, of course, an array of photovoltaic cells, or some other photoelectric transducer could be positioned to receive solar energy from the trough reflector.

Because of its cylindrical shape, the trough reflector described above has a focusing quality which is slightly less than optimum. The effects of aberrations, much like the spherical aberrations associated with spherically shaped lenses and mirrors, are to reduce the focusing qualities of cylindrical reflectors.

Theoretically, the best cross-sectional shape for a trough reflector is a symmetric parabola, defined by the general equation $x^2 = 4ay$. A reflector of a parabolic cross-section would, of course, act to reflect the incoming collimated solar rays to a line focus of minimum width. However, it is well known that, over limited arc lengths, symmetric parabolic curves closely approximate circular curves (defined by the general equation $x^2 + y^2 = r^2$). For example, a circular cross-section reflector having a 12-inch depth (measured between the plane of its edges and a parallel plane which tangentially contacts the reflective surface), a 120-inch width, and a radius of 156 inches approximates a parabolic cross-section reflector passing through the center and extreme points defined by $y = (1/300) x^2$. If superimposed, the maximum vertical deviations between the two cross-sections would be less than ⅛ inch. Incoming collimated light (as from the sun) striking the circular curve rather than the ideal parabolic curve would have a maximum deviation from the ideal parabolic focus position (approximately 81 inches away) of less than 1.4 inches.

In solar energy conversion work, the less-than-optimum focusing properties of cylindrical reflectors can, for many applications, be tolerated. The smaller the focus width, the higher the concentration ratio (for a fixed width collector), and the higher the achievable temperature of the working fluid. The higher the working fluid temperature, the higher the thermal efficiency of the system. But, thermal efficiency may be sacrificed in some applications to achieve economic feasibility.

This is particularly true in low concentration for photovoltaic generation and low temperature water heating.

However, in systems requiring a line of focus sharper than that capable of cylindrical reflectors, the cylindrical shape of the planar member produced in the manner set forth above may be fine-tuned toward the ideal parabolic shape by applying small additional forces at the ends of the structural beam—forcing the ends together or apart. Likewise, small forces may be applied at the center of the reflector in the direction of the axis of symmetry. Toward this end, a pair of tension springs 65 may be connected between a loading bar 66 which extends along the bottom surface of the planar member 10, parallel to its longitudinal axis, and a pair of L-shaped brackets 67. The latter are coupled to and extend downwardly from the transverse beams 20, 21. Springs 65 act to exert a downward force along the axis of symmetry at the midpoint of deflection of the planar member. By adjusting the spring tension (by means not shown) the shape of the planar member can be made to more closely approximate a paraboloid.

The following example illustrates how a working model of the invention was constructed.

EXAMPLE

A trough reflector, 24 inches wide and 12 inches in length, was constructed from a sheet of aluminum, 40 mils in thickness, in the following manner:

An aluminum sheet, 26 inches wide and 12 inches in length, was provided with screw holes along its longitudinal edges, the hole centerlines being 24½ inches apart. A pair of torquing shafts, each having a flattened surface along its length to interface with the aluminum sheet, was positioned between a pair of spaced transverse beams such that the longitudinal axes of the shafts were 24 inches apart. The respective length of each beam was made adjustable to allow the shaft spacing to be subsequently varied. Each shaft was mounted for rotation about its respective longitudinal axis. To assemble the reflector, one of the longitudinal edges of the aluminum sheet was fastened to one of the torquing shafts via screws. The aluminum sheet then spans the gap separating the shafts with the unfastened edge extending beyond the other torquing shaft. Pressure is then applied to the aluminum sheet at the midpoint between the torquing shafts, thereby causing the sheet to deflect and bringing the screw holes formed in the sheet into alignment with the flattened surface of the second torquing shaft. A midpoint deflection of about 2.4 inches is required. The aluminum sheet is then fastened to the torquing shafts. At this point, the concave shape of the aluminum sheet is caused by end loading; that is, forces acting through the fastening screws, torquing shafts and transverse beams that act to push the ends of the sheet toward each other. This focusing quality associated with such a shape is unsuitable for solar energy conversion work. To provide a means for altering this shape, a 4-inch torquing arm was clamped to each torquing shaft such that they extend upwardly and approximately parallel to one another. A tie rod, comprising a turnbuckle for adjusting its length was then connected between the free ends of the torquing arms. The turnbuckle was then tightened, thereby applying a twisting moment to the longitudinal edges of the aluminum sheet, until the concave shape of the sheet was substantially cylindrical. During rotation of the torquing shafts, the end load carried by the transverse beams was reduced to substantially zero; thus the deflection in the sheet was caused almost entirely by the twisting moments. The initial deflection of 2.4 inches was maintained until the cylindrical shape was achieved. For the 40 mil aluminum sheet, the twisting moment, M, required to fully account for the 2.4 inch midpoint deflection, $y$ was calculated from the following equation:

$$M = 8EIy/w^2$$

where $E$ is Young's Modulus, $I$ is the bending moment of inertia (which is defined by $bh^3/12$, where $b$ is the length of the sheet and $h$ is its thickness) and $w$ is the width of the reflector. It was calculated that a force of 5.33 lbs. in the turnbuckle would fully account for the 2.4 midpoint deflection. The radius of curvature of the cylindrical reflector was calculated to be approximately 30 inches.

In FIGS. 4 and 5 alternative schemes for applying the twisting moments to the longitudinal edges of the reflective, flexible planar member 10 are shown. In FIG. 4, the twisting moments are produced by weights 80, 81 acting through flexible cables 82, 83, respectively, and pulleys 84, 85 which are respectively coupled to the torquing shafts 15, 16. Shaft 16 is allowed to float in the slots 87, 88 formed in transverse beams 20, 21. By this arrangement, the shafts are subjected only to a twisting moment; hence, no end loads are applied to the reflector 10 which would tend to push the longitudinal edges together or apart. In FIG. 5, the twisting moments are produced by a tension spring 90 which is attached to the free ends of cables 91, 92. The other ends of cables 91, 92 are anchored to pulleys 93, 94, respectively, which are rigidly coupled to the ends of torquing shafts 15, 16, respectively. Idler pulleys 95, 96 act to divert the horizontal force applied by spring 90 to a downward force applied to the rims of pulleys 93, 94. As in the FIG. 4 embodiment, torquing shaft 15 is supported in a pair of slots formed in transverse beams 20, 21. Thus, planar member 10 carries no end loads as a result of the force applied by spring 90.

To provide large quantities of electrical or thermodynamic energy, it is common to connect several solar energy collectors in tandem. Such a system, using several of the trough reflectors of the FIG. 1 variety, is depicted in FIGS. 6 and 7. FIG. 6 is an end view of a plurality of trough reflectors directed at a zero sun angle, and FIG. 7 illustrates the same reflectors positioned at a non-zero sun angle. Note all reflectors are slaved together by rods 100, each being coupled between the end plates 76 of adjacent devices. By this arrangement, it is necessary to direct only one of the collectors at the sun, for instance, by a sidereal clock drive motor 101 (not shown). The conduit 102 which contains the working fluid is supported by the end plates via a slip coupling which enables those portions of the conduit positioned along the lines of focus of the reflectors to move relative to those positions of the conduit which interconnect adjacent devices. A flexible conduit (not shown) may be provided to connect the ends of conduit 102 with a storage tank. By this arrangement, the rigid conduit is allowed to move relative to the storage tank during the solar tracking movement of reflectors.

As the reflector/receiver apparatus illustrated in FIGS. 6 and 7 is moved pivotally to follow and remain aligned with the sun, predictable and significant changes may occur, depending on the thickness of planar member 10, to the cross-sectional shape of the reflector. Such changes in shape result from the changing orientation of the gravity vector with respect to the reflector axis. These changes will not be symmetric about the reflector axis, causing the lower side to droop below its intended position and a converse change on the upper side. This will cause the optimal focus position to shift from the original "on-axis" position, i.e., zero sun angle. The receiver position with respect to the "zero-droop" axis is automatically adjusted by the gravity-sensitive mechanism illustrated in FIGS. 8 and 9. As shown, the support 107 for the receiver element is pivotally mounted to the end plates 113 by means of pins 116 and pivot arms 115. Arms 115 are pivotally attached to end plates 113 by fixed pins 114. At the lower end of the pivot arms are counterweights 118 which are heavy enough to overcome the moment generated by the receiver 107, and be in a stable configuration as shown. As the tracking angle is changed, the counterweights 118 will maintain the pivot arms in alignment with the gravity vector, thus moving the receiver 107. The path and inclination of the receiver will be controlled by the length of arms and pin locations. Of course, the direction of compensation motion can be changed by locating the receiver at the lower ends of pivot arms 115 and eliminating the counterweights.

From the foregoing, it can be appreciated that the trough reflector of the invention, being manufactured from a relatively few number of inexpensive parts, lends itself to low-cost manufacture. Further, it should be appreciated that, owing to its simple construction, the trough reflector of the invention could be used for extraterrestial work which utilizes the sun's energy to furnish power.

For certain applications it may be desirable to construct a framework under a very thin reflective member and, rather than twist the reflective member as described above, apply twisting moments to the framework. This may be embodied as shown in FIG. 10. The torquing shafts supply their moments to intermediate framework 120 which may be as simple as a plurality of metal struts 123 running perpendicular to the torquing shafts and joined to them in the same manner as the reflector itself in the previous embodiment (such as FIG. 1). As the torquing shafts are rotated they cause the deflection in the framework. The reflector surface 121 (shown in phantom) is supplied by a thin sheet of metal or plastic which is fastened to the intermediate framework by screws 122 and thus follows the deflection of it to form the proper cross-sectional curve shape. The thin reflective sheet may or may not contribute significantly to the stiffness (resistance to bending) of the frame/reflector combination. The incorporation of the framework allows an increase in stiffness of the reflector-type member which is desirable to minimize gravity and wind induced deflections without significantly increasing the weight which would undesirably increase the gravity induced deflection.

While the invention has been described with particular reference to certain preferred embodiments, it will be appreciated that various modifications and extensions of the invention can be made without departing from its spirit and scope, as set forth in the enumerated claims. For instance, while the trough reflector of the invention has been described with particular reference to solar energy conversion work, it will be appreciated that its use is not in any way limited to such work. It can be utilized for any purpose requiring a cylindrical, or even parabolic, reflector of relatively large size.

I claim:

1. A method of making a trough reflector from a flexible planar member having a reflective surface, said method comprising the steps of supporting said member along a pair of spaced parallel axes extending in said member, and exerting on said planar member substantially equal but opposite twisting moments about said axes while enabling said axes to move toward each other, whereby said member assumes a concave shape, said twisting moments being exerted until the net forces in said member which would otherwise tend to push said edges together or apart are substantially zero.

2. The method of claim 1 further comprising the step of exerting a force at the midpoint of said planar member to modify the cross section of said concave shape toward that of a parabola.

3. The method of claim 1 further comprising the step of urging said axes toward each other to modify the cross-section of said concave shape toward that of a parabola.

4. A trough reflector comprising a flexible planar member having a reflective surface, a pair of spaced parallel elongated members for supporting said planar member therebetween, said elongated members being disposed in a common plane, means rigidly connecting said planar member with said elongated members, means for rotatably mounting said elongated members for rotation substantially about their respective longitudinal axes, means for rotating said elongated members in opposite directions about their respective longitudinal rotational axes, to predetermined positions at which said planar member assumes a substantially cylindrical shape, and means for maintaining said elongated members in said predetermined positions.

5. The trough reflector of claim 4 further comprising means for adjusting the spacing between said elongated members.

6. The trough reflector of claim 4 further comprising means for supporting a solar energy-responsive transducer at the optimal focus location of said planar member.

7. The trough reflector of claim 4 wherein said elongated members are rotatably supported on a beam, and means are provided for pivotally mounting said beam to enable said reflective surface to track the sun.

8. The trough reflector of claim 7 further comprising a solar energy-responsive transducer, means for normally positioning said transducer at the optimal focus location of said planar member, and means for adjusting the position of said transducer to compensate for shifts in the position of the optimal focus owing to the gravitational vector on the planar member as the position of the planar member is altered to track the sun.

9. The trough reflector of claim 4 wherein said means for rotating said elongated members comprises a pair of torque arms, one extending outwardly from the longitudinal axis of each elongated member, a strand of adjustable length connected between the torque arms, and means for adjusting the length of said strand.

10. The trough reflector of claim 9 wherein said adjusting means comprises a turnbuckle position in said strand, whereby said elongated members are rotated simultaneously in opposite directions as the turnbuckle is turned to adjust the length of said strand.

11. The trough reflector of claim 10 wherein said elongated members are supported by a pair of spaced beams, and wherein a first spring means is provided for positioning said elongated members with respect to one another, and wherein a second spring means is connected in said strand.

12. A plurality of trough reflectors according to claim 8 said reflectors being arranged to have parallel longitudinal axes and being interconnected by fixed length struts such that a sun-tracking motion imparted to the first reflector is transmitted to the remaining collectors.

13. A trough reflector comprising a flexible planar member having a reflective surface, and means for exerting equal but opposite twisting moments on said member until said member assumes a substantially cylindrical sector shape, said moments being exerted about a pair of spaced parallel axes extending in the plane of said member, said axes being free to move toward each other while said twisting moments are exerted.

14. The trough reflector of claim 13 further comprising means exerting a force at a position substantially midway between said parallel axes to modify said cylindrical sector shape toward a shape having a parabolic cross-section.

15. The trough reflector of claim 13, further comprising means to urge said axes toward each other, thereby modifying the cylindrical sector shape toward a shape having a parabolic cross-section.

16. The trough reflector of claim 13 further comprising a plurality of spaced coplanar struts and means for rigidly coupling said planar member to said struts, and wherein said axes extend in the plane of said struts and wherein said exerting means comprises means for exerting equal but opposite twisting moments on said struts.

17. A trough reflector comprising: (a) a frame; (b) a flexible planar member having a reflective surface; (c) first and second support means for supporting said member along first and second spaced parallel axes extending in said member, said first and second support means being movably mounted on said frame for independent rotational movement about third and fourth axes, respectively, extending parallel to said first and second axes, and for relative translational movement in a direction substantially perpendicular to said parallel axes to enable the spacing between said third and fourth axes to be varied; and (d) means for exerting equal but opposite torques on said first and second support means, whereby said support means rotate in opposite directions about said third and fourth axes, respectively, and move toward each other until said planar member can assume a cylindrical-sector shape.

18. The trough reflector of claim 17 further comprising means for exerting a force at a position substantially midway between said parallel axes to modify said cylindrical sector shape toward a shape having a parabolic cross-section.

19. The trough reflector of claim 17 further comprising means to urge said first and second support means toward each other to modify said cylindrical-sector shape toward a shape having a parabolic cross-section.

20. The trough reflector of claim 17 further comprising a plurality of spaced coplanar struts and means for rigidly coupling said planar member to said struts, and wherein said axes extend in the plane of said struts and wherein said exerting means comprises means for exerting equal but opposite twisting moments on said struts.

* * * * *